March 14, 1939.　　A. L. BARNES　　2,150,312
DIFFERENTIAL MECHANISM
Filed June 30, 1938　　3 Sheets-Sheet 2

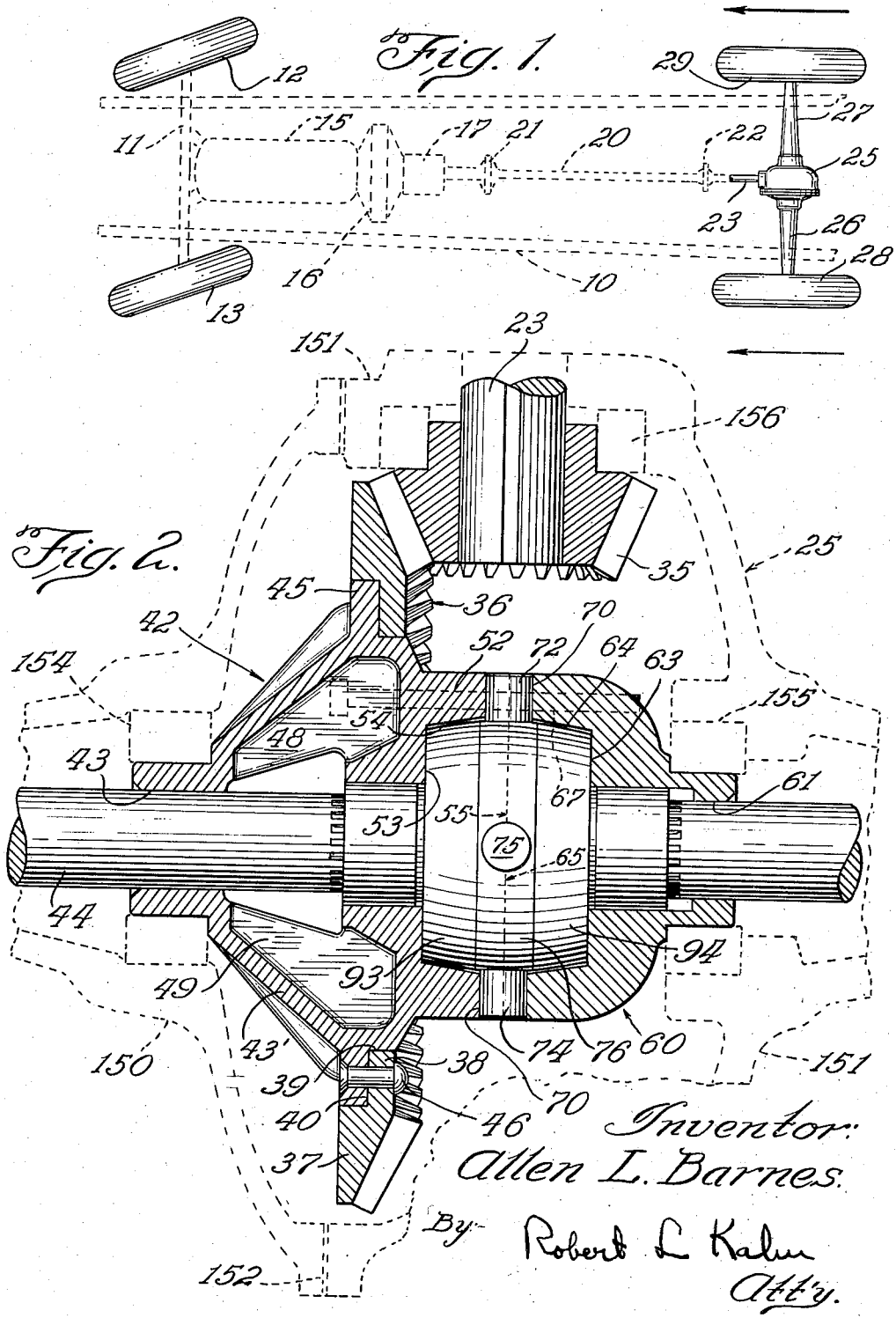

Inventor.
Allen L. Barnes.
By Robert L. Kahn
Att'y

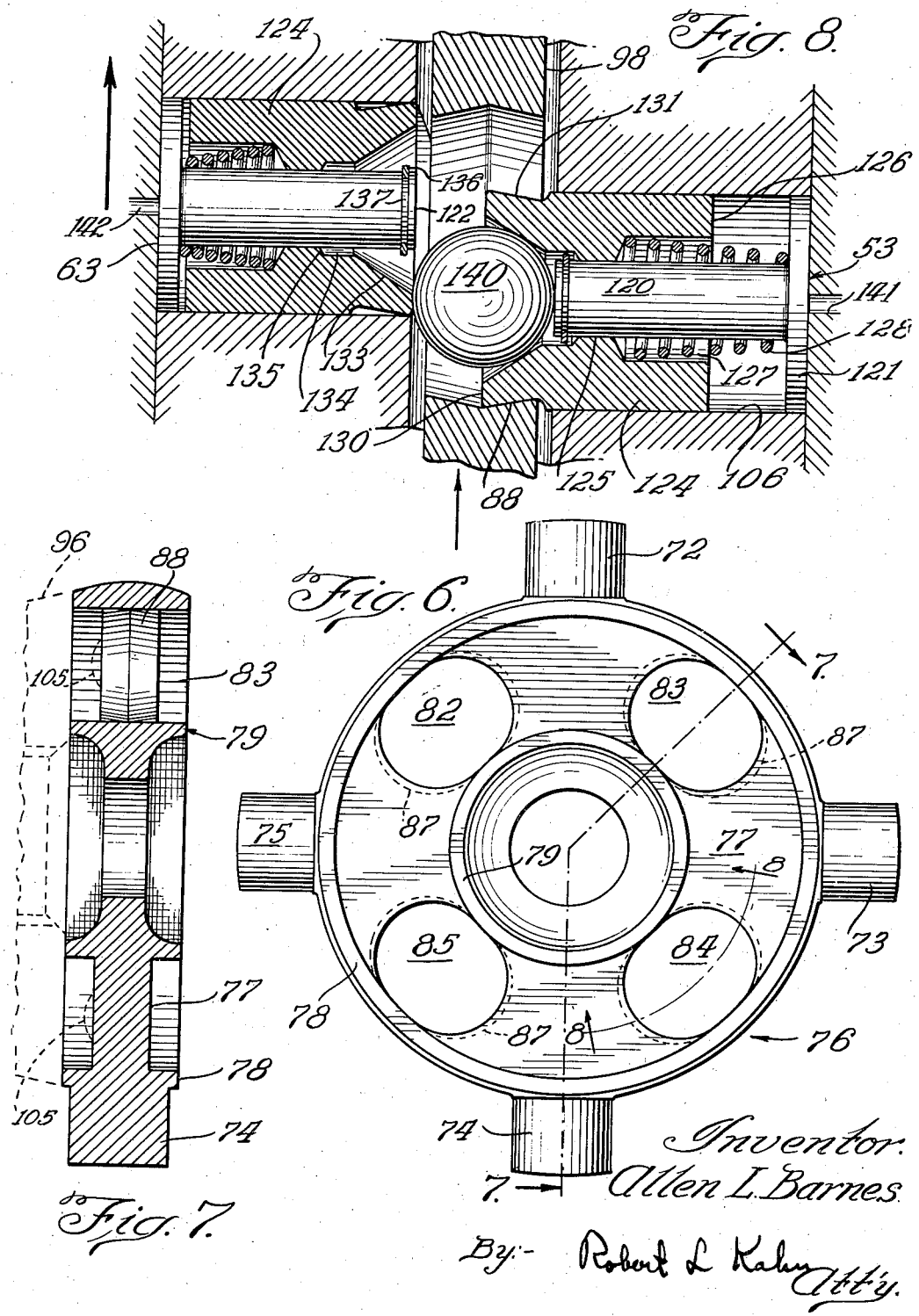

Patented Mar. 14, 1939

2,150,312

UNITED STATES PATENT OFFICE 2,150,312

DIFFERENTIAL MECHANISM

Allen L. Barnes, Oak Park, Ill., assignor to Perfection Gear Company, Harvey, Ill., a corporation of Illinois Application June 30, 1938, Serial No. 216,747

17 Claims. (Cl. 74—389.5)

This invention relates to a differential mechanism which may be used on automobiles or any other device or mechanism. The customary differential on the automobile suffers from a serious drawback. The power is divided between the two driven wheel axles in a continuously varying amount dependent upon the relative tractions. The driven speeds may each vary from zero to a maximum value. As is well known, when one of the driven axles has no traction, it tends to rotate at a maximum speed, thus wasting all of the power and preventing any power from being applied to the other driven axle.

The lack of positive drive is the chief objection to this type of differentials. Many attempts have been made to overcome this type of action with indifferent success.

This invention obtains a differential action on an entirely different principle. This invention permits differential action so that any one driven axle may turn faster than a minimum speed determined by the driving shaft but cannot turn slower. The power is applied to both wheels in proportion to their power requirements. At the minimum driven speed, power is transmitted to the axles. However, upon any condition requiring one driven axle to increase its speed above the minimum, means are provided whereby said axle may turn faster, this being accomplished by a temporary disconnection of the power drive. Such a differential has the advantage of providing for a maximum power drive to one or both driven axles under all possible conditions. With a differential of this character applied to an automobile or truck it is obvious that there will not be any stalling due to one driving wheel turning loosely in mud while the other is stationary on solid ground. In a case of this character both wheels would have power applied to turn them.

In addition, the wear on tires travelling on rough roads is greatly reduced. With the present differential, any driving wheel which is momentarily clear of the ground because of a bump or hole begins to spin while the other wheel has no pull. Upon resumption of tractive conditions, the tire is suddenly stopped from spinning with a resultant abrasion. With the present invention, the free wheel has no tendency to spin but continues its normal rotation.

The construction disclosed herein is particularly adapted to be disposed in automotive vehicles and may replace the so-called standard differential now in use with a minimum of labor and expense. The mechanism while satisfying this replacement requirement is exceedingly simple and may be manufactured by present day manufacturing methods without any unusual operations being required. The parts are thoroughly interchangeable and the assembly is simple and fool-proof. In particular, the various parts are so designed that the entire differential fits together accurately without any delicate manipulation or measurements. Such considerations are of great importance in automotive vehicles because of the cost and service angles. The mechanism is rugged and positive in action.

Referring to the drawings:

Figure 1 is a diagrammatic representation of an automotive vehicle showing the location of the differential;

Fig. 2 is a section of the differential;

Fig. 6 is a view of the driving member or ring;

Fig. 7 is a section on line 7—7 of Fig. 6; and

Fig. 8 is a section of the differential illustrating the mechanism during differentiation and taken on line 8—8 of Fig. 6 with an assembled device.

Figure 3:
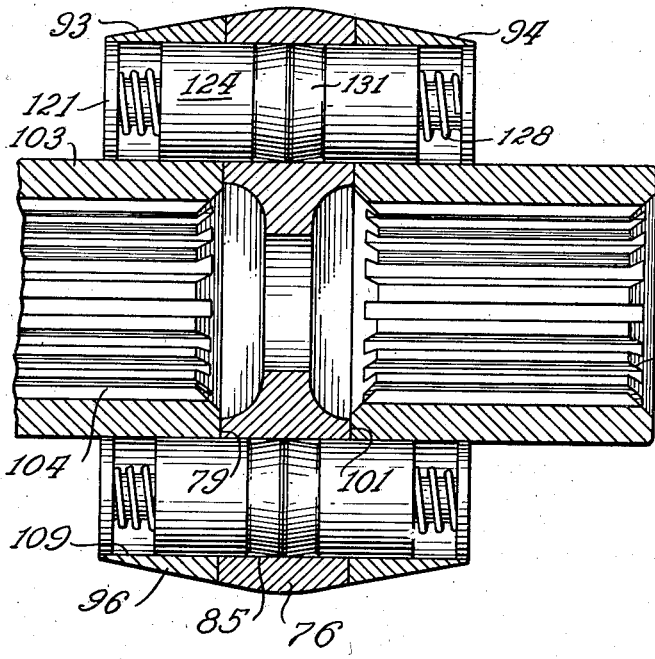
Fig. 3 is an enlarged section of the differential proper without the case and ring gear.

The differential in general comprises a driving member having the general shape of a spider with camming members such as balls disposed in suitable apertures therein. On opposite sides of the spider are driven members carrying spring pressed driving pins. These driving pins are normally adapted to extend into the spider apertures to be engaged by the spider and driven thereby. However, when differential action is necessary, a displacement of one driven member with respect to the spider in advance of the rotation thereof occurs and by virtue of a camming action, the advancing pin is forced out from the spider and in its retracted position is permitted to move ahead in accordance with its requirements. This retracted driven pin may reengage with another spider aperture when its speed is down to normal.

Referring to Fig. 1, there is shown diagrammatically an automotive vehicle having a frame 10 provided with a front axle 11 and front wheels 12 and 13. A suitable engine 15 is the source of motor power and this is transmitted through any suitable clutch mechanism 16 and transmission 17 to a drive shaft 20. The drive shaft may have universal joints 21 and 22 if desired. A pinion shaft 23 goes into a differential housing 25 from the opposite sides of which extend axle housings 26 and 27. Within these axle housings are journalled axles, not shown, adapted to turn rear driving wheels 28 and 29. As clearly shown in the figure, front wheels 12 and 13 have been turned so that wheel 29 will have to turn faster than wheel 28. This is diagrammatically indicated by the arrow above 29 being heavier than the arrow below wheel 28. Throughout the specification herein the heavier of two arrows will indicate faster motion in the same direction.

Referring to Fig. 2, pinion shaft 23 within housing 25 has locked thereto a pinion gear 35. This gear meshes with a ring gear 36. It is understood, of course, that the two gears 35 and 36 need not necessarily be bevel gears and may be worm gearing or any other means. Ring gear 36 has the body 37 thereof machined to form an inwardly extending flange 38 having an annular face 39 undercut below the main body 37 and forming a radial face 40.

Supporting the ring gear is one-half of casing 42 having the shape shown in Fig. 2. This case section comprises a sleeve 43 through which one of the driven axles 44 projects. From sleeve 43 of the casing, the body 43' flares out to an annular flange 45. Flange 45 is machined to fit faces 39 and 40 of ring gear 37 and the two are rigidly maintained by rivets 46 disposed at suitable intervals around the assembly.

In order to reduce the weight of the half casing 42, interior 48 is hollow with strengthening rib 49 provided, this being well known in the art. Projecting from the inner portion of flange 45 of the casing is a portion 52 having machined surfaces 53, 54 and 55 in generally stepped relationship. The end of portion 52 is shown by dotted lines 55 and 65. In abutting relationship to this portion of casing 42 is the other half of casing 60 having a sleeve 61 similar to sleeve 43 of casing 42. Casing 60 is provided with machined surfaces 63, 64 and 65 in stepped relation corresponding to surfaces 53, 54 and 55 of the opposing casing.

Opposed faces of the two case sections 52 and 60 meet at lines 55 and 65 and are held together by bolts 67. At spaced intervals, here at 90°, the opposed casing faces 55 and 65 are provided with radial cylindrical grooves 70, each casing having half of the groove cut in its face.

Disposed in the radial channels 70 are the four lugs 72–75 (Fig. 6) of a driving member 76. This member has a web 77 bounded by annular flanges 78 and 79 on the outer and inner edges thereof respectively. As clearly shown in Fig. 7, the member is symmetrical with respect to its main central plane so that the opposite sides or faces thereof are similar. The four lugs 72–75 inclusive extend outwardly from the annular flange 78. Both inner flanges 79 are machined for bearing purposes.

Web 77 has at uniformly spaced points, here shown as four, channels or apertures 82–85 inclusive. These apertures are of a generally oblong shape. In practice true circles may be provided at first, then the metal may be removed to elongate the circle along a circular arc.

As shown in Figs. 6–8 inclusive, apertures 82–85 have more material cut from the leading and lagging ends at the central plane of the driving spider so that these ends are undercut. Thus dotted lines 87 in Fig. 6 show the outline of apertured parts 82–85 at the median plane. This is also indicated in Fig. 7 by the V-shaped section 88. The precise shape of the line joining the median section and surface is immaterial so long as symmetry is maintained with respect to the median plane. Hence the V-shape is merely illustrative of a concave driving or engaging surface. It is possible to eliminate undercutting entirely and merely have straight walls.

Disposed on opposite faces of driving member or spider 76 are two driven side plates or sleeves 93 and 94. Both are identical so that a detailed description of one only is necessary. Thus plate 93 comprises a cylindrical body bounded on the outside by a projecting flange portion 96 having a front face 97 set back from face 98 of the plate. This leaves a peripheral portion 99 which is adapted to bear against the corresponding inside surface of ridge 78 of driving spider 77.

The central portion of face 98 is countersunk to form an annular bearing portion 100 and a face 101. This bearing portion 100 is adapted to surround flange 79 of a driving spider so that the flange face opposes spider face 101. The central portion of driven plate 93 is extended to form a hub 103. The interior of hub 103 is splined at 104 to rotatively engage a splined axle 44.

Figures 4, 5:
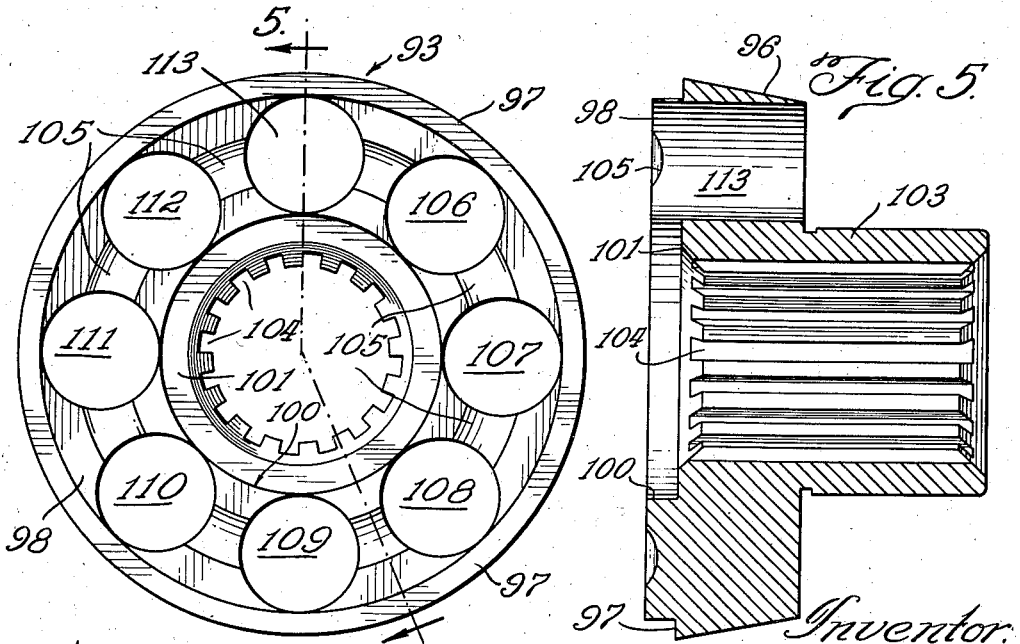
Fig. 4 is a front view of one of the driven members or side drive sleeves.
Fig. 5 is a section on line 5—5 of Fig. 4.

The annular face 98 is provided with an annular grooved race 105 whose section may be any shape such as a circular arc. As shown in Fig. 4 this race is between inner and outer edges of face 98. At spaced uniform intervals corresponding in number, or a multiple thereof, of channels 82–85 inclusive there are provided chambers 106–113 inclusive. These may extend the full thickness of the driven member.

Within each chamber is a spring pressed means shown in detail in Fig. 8. Since they are all alike, only one will be described in detail. A throat pin 120 has a flanged head 121 smoothly fitting in bore 106 of the chamber. The free end 122 is flat and parallel with face 98 of the driven member. In telescoping relation to the throat pin is a hollow plunger 124 having a channel 125 in which pin 120 may fit snugly. One end 126 of plunger 124 is provided with an enlarged chamber or recess 127 coaxial with the plunger bore. Within this recess 127 lies one end of a coil spring 128 disposed around throat pin 120 and bearing against flanged head 121. As shown the spring is conical with the large end in the plunger although the shape is unimportant.

Around the outer portion of end 130 of the plunger, the metal is cut away to form as here shown, a generally conical portion 131 to interfit with the undercut half of the engaging or driving face 88. In case the undercutting is eliminated, then the driving pin is left in its original shape without cut away part 131. The free end 130 of the plunger is recessed out to form a conical throat 133 tapering down to a cylindrical chamber 134 which has a shoulder 135 defining one end of channel 125. As is clear from the drawings, plunger 124 is just long enough so that in its compressed disengaged off-normal position as shown on the left hand side of Fig. 8, the free end 130 is substantially flush with face 98 of the driven member. A retaining ring 136 in a slot 137 near the free end of throat pin 120 maintains the plunger and pin in assembled relation as a unit.

Disposed within each channel or aperture 82–85 of the driving spider member is a cam such as a ball 140. This ball normally can move in its retaining aperture for a predetermined angular distance along the path of rotation of the spider. However, as shown in Fig. 8, any angular displacement of one driven member with respect to the other driven member will result in the advancing driven plunger being pushed away from the spider into a retracted position to clear the spider.

Referring to Fig. 8, it must be remembered that spider 88 is the driving means and thus normally tends to cause the opposing plungers to be disposed at the lagging end of the cooperating channel. If both driven members tend to slow up equally, as when the engine is being used for braking, then the spider becomes the driven member temporarily and both plungers move to the other end of the cooperating channel. But as long as both driven members with their plungers tend to remain together with the plungers of each cooperating pair being in line with each other, then the plungers will be pressed forward to their normal position, as the right hand one of Fig. 8. However, if one driven member tends to speed up with relation to the other driven member then the following occurs. As seen in Fig. 8 the left hand driven member tends to go faster. This causes each plunger to advance with respect to the right hand plungers. The interlocking engagement of driving surface 88 and 131 of the plunger is broken permitting motion of the plunger against its spring bias. At the same time, the cam action of ball 140 on throat 133 forces the advancing plunger away from the spider. Obviously the lagging plunger, on the right hand side of Fig. 8, is locked against longitudinal movement so that the advancing plunger must yield. By suitable design of the plunger throat, ball size and play or lost motion in spider channel, it is possible to have a portion of the plunger end 130 catch on spider web 77. If all advancing plungers are thus treated the entire driven member is disengaged and permitted to travel ahead. Upon a new position of symmetry with respect to the other driven member when opposing plungers are opposite each other, normal conditions will obtain with the two plungers in abutting paired relation unless a second advancing cycle is repeated.

In case no undercutting of the spider is provided and with the driving pins having a plain cylindrical shape, the action is generally similar. The pressure of the spider aperture wall on the driving pins will tend to make retraction of the lagging pins difficult. Such a construction, while less satisfactory, is cheaper and may be satisfactory for certain purposes.

By providing twice as many pairs of plungers as driving apertures in the spider a quicker engagement results. This ratio may be reversed or changed as desired.

As shown in Fig. 8, flanged heads 121 of the throat pins are adapted to ride along the machined surfaces 53 or 63 of the housing 50 and 60 as the case may be. Relief apertures 141 and 142 in walls 53 and 63 are provided.

The entire differential may be disposed in a standard differential housing 25 shown in dotted lines in Fig. 2. Thus portions 150 and 151 may meet at 152 and be bolted. Bearings 154 and 155 may be provided to support portions 43 and 61 of the inner housing. Bearing 156 is provided for gear 35.

I claim:

1. In a differential, the combination of a flat driving member rotatable in its own plane about an axis, said member having a series of separate channels therethrough parallel to and equidistant from said axis, a driven plate on each side of the driving member and coaxial therewith, a plurality of pins carried by each of said plates on opposite sides of the driving member, opposed pins normally extending toward each other in each channel to form a cooperating pair, means for urging said pins toward each other to a normal advanced position, said pins and channels being so related as to provide a predetermined angular lost motion with respect to the channel along the line of rotation, said driven plates being normally adapted to be retarded to press at least certain of the pins against the trailing shoulders of the channels, a ball in each channel and having a similar lost motion and adapted to be between opposite ends of each cooperating pair of pins during normal conditions and means on said pins whereby any advance of one pin with respect to an opposing pin results in said ball tending to increase the distance between the opposing pins so that one of the pins of each pair is forced into a retracted position to clear the channel and slide by along the surface of the driving member.

2. The structure of claim 1 wherein each pin is hollowed out to cup a portion of the ball with the hollowed portion serving to co-act with the ball for retracting the pins.

3. The structure of claim 1 wherein each of the pins is a spring pressed hollow member telescoping with a relatively stationary pin.

4. In a differential, the combination of a driving spider rotatable in its own plane about its axis, said spider having a series of separate channels therethrough parallel to and equidistant from said axis, each channel being undercut at the leading and trailing ends thereof so that the channel wall extends from the center plane of the spider toward the channel center to form driving shoulders, a driven plate on each side of the spider and coaxial therewith, a plurality of spring pressed means carried by each of said plates on opposite sides of the spider, opposed spring pressed means normally extending toward each other in each channel to form a cooperating pair, each spring pressed means having a predetermined angular lost motion with respect to the channel along the line of rotation and having a cooperating surface adapted to engage the driving shoulders in their normal position, rolling means having a similar lost motion disposed in each channel and adapted to be between opposed ends of each cooperating pair of spring pressed means during normal conditions and cam means on each spring pressed means cooperating with the rolling means for moving the advancing one of each of said cooperating pairs against its spring bias away from the driving spider into a clearing non-engaging position to permit the driven plate containing each advancing spring pressed means to rotate faster.

5. In a differential, the combination of a driving spider rotatable in its own plane about its axis, said spider having a series of separate channels therethrough parallel to and equidistant from said axis, each channel being undercut at the leading and trailing ends thereof so that the channel wall extends from the center plane of the spider towards the channel center to form driving shoulders, a driven plate on each side of the spider and coaxial therewith, said driven plates being disposed in face to face relationship and having a plurality of recesses therein, a spring pressed means in each recess, a pair of opposing spring pressed means normally extending toward each other into one channel to form a cooperating pair, said spring pressed means being so proportioned as to provide a predetermined angular lost motion with respect to any channel along the line of rotation, each spring pressed means having a cooperating surface formed on the outside thereof adapted to engage the spider driving shoulder during normal conditions, rolling means disposed in each channel and having similar lost motion and adapted to be between opposed ends of each cooperating pair of spring pressed means under normal conditions and cam means on each spring pressed means cooperating with the rolling means for moving the advancing one of each of said cooperating pairs of spring pressed means against its spring bias to move said spring pressed means away from the driving spider into a clear non-engaging position to permit the driven plate containing such advancing spring pressed means to rotate faster.

6. The structure of claim 5 wherein said rolling means comprises a ball in each channel.

7. In a differential, the combination of a driving spider rotatable in its own plane about its axis and provided with a series of separate channels therethrough parallel to and equidistant from the axis thereof, each channel being undercut at the leading and trailing ends thereof so that the channel wall extends from the center plane of the spider toward the channel center to form driving shoulders, a driven plate on each side of the spider and coaxial therewith, each driven plate having a series of recesses therein for registering with each other and with the channels, a spring pressed driving pin in each recess and normally urged toward said spider, each pin being so proportioned relatively to the spider channel as to provide a predetermined amount of angular lost motion, the spider and portion of each driving pin having the outside thereof shaped to provide an interlocking engagement with the spider driving shoulder, a rolling means in each channel and normally adapted to be between two opposite driving pins, the spider end of said driving pins being hollowed out to clear a portion of said rolling means with said rolling means having substantially the same amount of lost motion as the driving pins, the rolling means and driving pins being so proportioned that upon the advance of one driven plate with respect to the other driven plate the advancing driving pins are forced away from the spider against their spring bias by the rolling means to permit said retracted driving pins to slide along the face of the spider.

8. The structure of claim 7 wherein each rolling means comprises a ball.

9. The structure of claim 7 wherein each driving pin is provided with a stationary pin telescoping therewith and normally flush with the first pin in its retracted position to prevent a retracting pin from pulling the rolling means therewith.

10. The structure of claim 7 wherein each driving pin comprises a hollow plunger having a stationary pin telescoping therewith with the spider end of each stationary pin in the hollowed part of the plunger and normally flush with the plunger in its retracted position and wherein the roller means comprises a ball.

11. In a differential, the combination of a flat driving spider rotatable in its own plane about its axis, said spider having a series of separate channels therethrough parallel to and symmetrically disposed around said axis, each channel being undercut at the leading and trailing ends thereof so that the channel wall extends from the center plane of the spider toward the channel center to form driving shoulders, a ball in each channel having a predetermined amount of angular lost motion with respect to the channel along the line of rotation, a flat driven member on each side of the spider in face to face relation therewith, each driven member having a plurality of recesses registering with the channels, a driving pin in each recess, said driving pin comprising a cylindrical plunger movable in said recess to and from said spider with an end portion thereof normally extending into a channel in one position, the outside of said end portion being shaped to interlock with the spider driving shoulder and the inner portion thereof hollowed out to permit a portion of said ball to be cupped therein, means for resiliently urging each plunger toward the spider, said ball, channel, and plungers being so shaped that upon the advance of one driven member with respect to the other driven member a camming action takes place forcing the advancing plungers against their spring bias away from the spider to permit said retracted plungers to slide over the spider surface.

12. The structure of claim 11 wherein each plunger is hollowed out to provide a center channel and wherein a stationary pin passes through said center channel and has means on the inwardly extending end portion of said pin to maintain the pin and plunger in assembled relation.

13. The structure of claim 11 wherein the driving spider is provided with a plurality of arms extending radially away from the periphery, and wherein a housing is provided for enclosing each of the driven members and engaging said radial spider arms and wherein the driving force is communicated to said housing for transmission to said spider.

14. In a differential, the combination of a flat driving spider rotatable in its own plane about its axis, said spider having a series of separate channels therethrough and equidistant from the axis with the channels elongated along the line of rotation, each channel being undercut at the leading and trailing ends thereof so that the channel wall extends from the center plane of the spider toward the channel center to form driving shoulders, a driven plate on each side of the spider and coaxial therewith, said two driven plates and spider being in face to face relationship, each driven plate having a series of channels therethrough adapted at various times to register with the spider channels, a ball in each spider channel, a plunger in each driven plate channel, said plunger being movable to and from the spider and having a portion normally extending into the spider channel, said plunger having the outside of a portion shaped to cooperate with the spider driving shoulder and having the inside hollowed out to cup the ball, said ball and plunger normally having a predetermined amount of angular lost motion along the line of rotation with respect to the spider channel and the cupped part of the plunger being so shaped that upon the advance on one driven plate with respect to the other, each ball forces the advancing plunger away from the spider into a position normally flush with its driven plate, spring means for urging each plunger toward the spider and a housing enclosing the driven plates and driving spider to maintain the same in assembled relation.

15. The structure of claim 14 wherein said spider is provided with a plurality of arms extending outwardly from the periphery thereof and wherein the housing is provided with means for engaging said arms with the driven plates free to rotate in said housing and wherein the driving force is initially applied to said housing.

16. The structure of claim 14 wherein each driven plate is provided with a mushroom shaped member with the head disposed in the channel and normally bearing against the adjacent housing and wherein the plunger is bored to permit the reduced portion of the mushroom member to project therethrough to normally extend flush with the driven plate and function as a stop for the ball.

17. For use in a differential, the combination of an elongated pin having an enlarged head, a sleeve telescoped over said pin, said sleeve having one end projecting beyond the inwardly extending end portion of said pin, said projecting end being hollowed out, a coil spring disposed around said pin between said enlarged head and the sleeve, and means on the inwardly extending end portion of said pin for retaining said pin, sleeve and spring in assembled relation.

ALLEN L. BARNES.